US006017409A

United States Patent [19]

Uno

[11] Patent Number: 6,017,409

[45] Date of Patent: Jan. 25, 2000

[54] METHOD FOR MANUFACTURING PASSPORT

[76] Inventor: Tadao Uno, 1-84, Matsugaoka 1-chome, Chigasaki-shi, Kanagawa-ken, Japan

[21] Appl. No.: 08/944,569

[22] Filed: Oct. 6, 1997

[30] Foreign Application Priority Data

Aug. 4, 1997 [JP] Japan .................................... 9-209327

[51] Int. Cl.[7] ........................... B32B 31/00; G06K 09/00; G06K 15/00

[52] U.S. Cl. .......................... 156/277; 395/104; 395/106; 395/117

[58] Field of Search ......................... 156/93, 277; 380/55; 395/104, 106, 117

[56] References Cited

U.S. PATENT DOCUMENTS

| | | | |
|---|---|---|---|
| 4,180,207 | 12/1979 | Lee | 235/493 |
| 4,236,952 | 12/1980 | Krause et al. | 156/93 |
| 4,879,747 | 11/1989 | Leighton et al. | 380/23 |
| 4,911,478 | 3/1990 | Oshikoshi et al. | 283/109 |
| 5,075,862 | 12/1991 | Doeberl et al. | 358/1.18 |
| 5,337,361 | 8/1994 | Wang et al. | 380/3 |
| 5,490,217 | 2/1996 | Wang et al. | 380/51 |
| 5,528,732 | 6/1996 | Klotz, Jr. | 358/1.6 |
| 5,613,045 | 3/1997 | Moritomo et al. | 358/1.2 |

*Primary Examiner*—Francis J. Lorin
*Attorney, Agent, or Firm*—Wenderoth, Lind & Ponack, L.L.P.

[57] ABSTRACT

A method for manufacturing passports comprising a first recording step of reading visually readable personal data from a data base of a passport book-making line and recording the same on a personal data sheet base at an entrance of a passport book-making line; a passport book-making step including a step of binding the personal data sheet together with a visa sheet, etc.; and a second recording step of reading the visually readable personal data on the personal data sheet after the passport bookmaking step is performed and recording the same on the personal data sheet in a mechanically readable personal data form.

3 Claims, 10 Drawing Sheets

METHOD FOR MANUFACTURING PASSPORT

BACKGROUND OF THE INVENTION

This invention relates to a method for manufacturing passports, in which passports each containing personal data are continuously manufactured on a book-making line.

Passports are official documents issued by the countries of to those nationals who are visiting countries abroad, for the purposes of certifying the nationality, personal status, etc. of those nationals and asking authorities of the visiting countries to render conveniences and protection, etc. to those nationals.

Heretofore, it was customary that many booklets of virgin passports containing no personal data, etc. are prepared and stocked beforehand, so that when an application for a passport is made, personal data of that applicant can be recorded on the booklet type virgin passport for immediate issuance.

Specifically, a booklet type virgin passport is manufactured in one place, namely, factory a, and personal data are recorded on the virgin passport in another place, namely, a branch office of the country.

More specifically, the conventional passport is made by combining, as shown in FIGS. 14A and 14B, a data sheet 1 for recording personal data therein, a protective film 5 laminated on the data sheet, and visa sheets 2 for official sealing. Then, the sheet 1, the film 5 and the visa sheets 2 are stitched together with a thread using a sewing machine along the central binding line. Then, a cover sheet 3 is bonded to an outer surface of the personal data sheet 1 by an adhesive agent and the protective film 5 is laminated on an inner surface of the data sheet 1, so that the personal data recorded on the data sheet is fully protected. Reference numeral 4 denotes a stitching thread.

As shown in FIG. 14C, the personal data sheet 1 includes a zone V for recording visually readable personal data thereon, and a zone M for recording machine readable personal data thereon.

Specifically, the personal data sheet 1 is bisected into two pages along the central binding line Y and one of the two pages is used as a data recording page. A comparatively large region of the data recording page along the central binding line Y serves as the zone V for recording the visually readable personal data, and a comparatively small region of the data recording page along a front edge serves as the zone M for recording the mechanically readable personal data.

The mechanically readable personal data are data to be optically read by inserting a front edge of the cover sheet 3 attached with the data sheet 1 into the interior of a reading slot of a reaching machine.

As previously mentioned, heretofore, a booklet type virgin passport having the data sheet 1, the visa sheets 2 and the cover sheet 3 stitched together by the stitching thread 4, the cover sheet 3 being bonded to the outer surface of the data sheet 1 through an adhesive agent, was manufactured in a bookmaking factory. Then, as shown in FIGS. 14A, and 14B, a branch office of the country having an authority to issue passports recorded the visually readable personal data on the recording zone V of the data sheet 1 of the booklet type virgin passport using a printing machine 6, recorded the mechanically readable personal data on the recording zone M using a printing machine 7, then placed the protective film 5 on the surface of the data sheet 1 for lamination by means of a hot plate or high frequency bonding means. A fully recorded passport as a final product was then handed to the applicant.

However, this conventional system for issuing a passport is pointed out as being not very efficient and as taking a long time from the date of application to the date of issuance of a passport. Moreover, the stocked booklet type virgin passports are sometimes used for counterfeit.

Moreover, in the conventional method for recording the visually readable personal data on the recording zone V by opening a bookmaking completed virgin passport, a large area of the recording zone V is difficult to obtain and therefore, the area of the mechanically readable personal data recording zone M is reduced.

Specifically, as shown in FIG. 14A, in the bookmaking completed virgin passport, the sheets are stitched together with the stitching thread 4. For this reason, it is difficult to record data onto the throat region S along the central binding line Y formed by the stitching line 4. As a consequence, the area of the recording zone V is reduced and therefore, the area of the recording zone M is also reduced. Moreover, it is difficult to record the visually readable personal data in an area very close to the central binding line Y. This offers a possibility to counterfeit the passport.

The present invention has been accomplished in view of the above situation.

SUMMARY OF THE INVENTION

It is, therefore, an object of the present invention to provide a method for manufacturing passports in which a passport with visually readable personal data and mechanically readable personal data recorded thereon can be continuously manufactured in an efficient manner.

It is another object of the present invention to provide a method for manufacturing passports in which a visually readable personal data recording zone V can be expanded to be very close to the central binding line Y.

In order to achieve the above objects, there is essentially provided a method for manufacturing passports comprising a first recording step of reading visually readable personal data from a data base and recording the same on a personal data sheet base at an entrance of a passport book-making line; a passport bookmaking step including a step of binding the personal data sheet together with a visa sheet, etc.; and a second recording step of reading the visually readable personal data on the personal data sheet after the passport bookmaking step is performed and recording the same on the personal data sheet in a mechanically readable personal data form.

The passport bookmaking step may include a step of finish-cutting three sides of the passport excluding a back thereof.

The bookmaking step may include a step of binding a see-through protective film, and the method may further comprise a step of laminating the protective film on an inner surface of the personal data sheet such that the protective film covers the mechanically readable data and the visually readable data, as a step to be performed after the step of recording the machining readable personal data is performed.

BRIEF DESCRIPTION OF THE DRAWINGS

A more complete understanding of the invention and many of the attendant advantages thereof will be readily obtained as the same becomes better understood by reference to the following detailed description when considered in connection with the accompanying drawings, wherein.

DETAILED DESCRIPTION OF THE EMBODIMENT

A passport according to the present invention is manufactured by the following method.

Figure 1B:
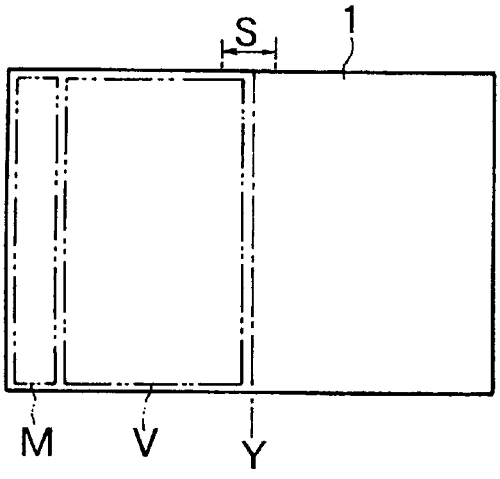
FIG. 1B is a plan view of a data sheet.
Figure 1A:
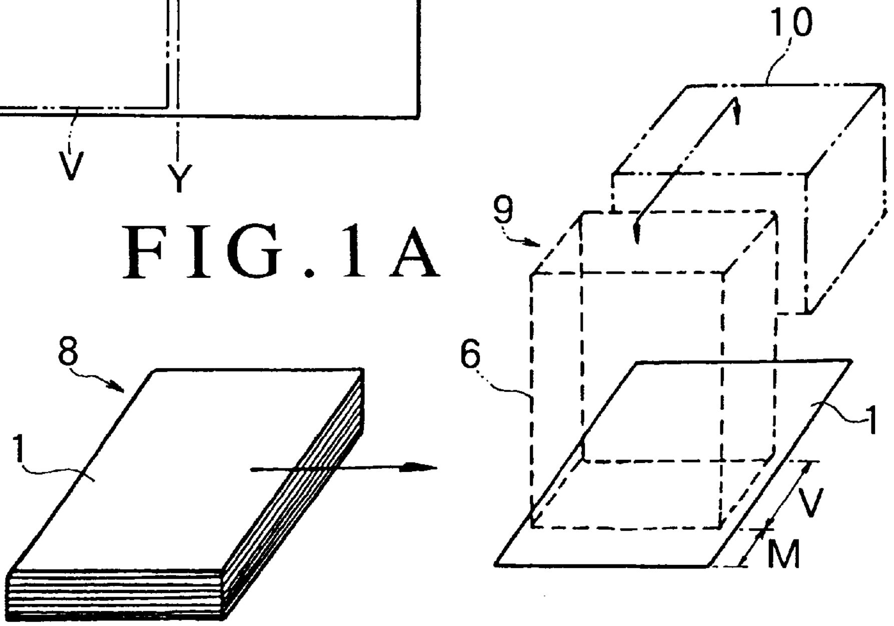
FIG. 1A is a perspective view showing a first recording step of recording visually readable personal data on a data sheet.

As shown in FIGS. 1A, and 1B, a stock of a plurality of data sheets 1 stacked up is preliminarily placed at an entrance of a bookmaking line in a stock position 8. Then, the data sheets are each fed to a printing position 9 from this stock position 8. On a surface of a recording zone V of each sheet 1, visually readable personal data are recorded using a printing machine 6, and a recording zone M is left blank.

This step of recording visually readable personal data on the data sheet 1 before a process of bookmaking is referred to as a first recording process.

The visually readable personal data can be recorded even on a region proximate to a central binding line Y along which the data sheet is stitched with a thread as later described, without any limitation as had been the case in the prior art.

As an effective method for preventing the counterfeit of a passport, there is a provision of a throat region S of each data sheet 1, so that the personal data can be recorded on the throat region S including the central binding line Y. Data other than personal data, such as hidden data, namely, anti-counterfeit data may also be recorded on this region S.

The personal data and the anti-counterfeit data may be recorded, either directly or indirectly, on an entire surface of the data sheet 1 including a surface of a left page, a surface of a right page bisected along the central binding line Y, and the central binding line Y.

The personal data includes a photograph of a face, name, age, sex, present address, permanent address, nationality, etc. of the passport applicant.

Such personal data are stored, as a data base, in a computer 10. For printing to the data sheet 1, personal data are extracted from this data base and given to the printing machine 6.

By employing a method for extracting data of each passport applicant from the data base and printing them on each data sheet, there can be prepared data sheets each with personal data of each passport applicant recorded thereon before the sheets are made into a booklet type passport. Then, the data sheets recorded thereon with personal data are subjected to the following bookmaking step.

Figure 2:
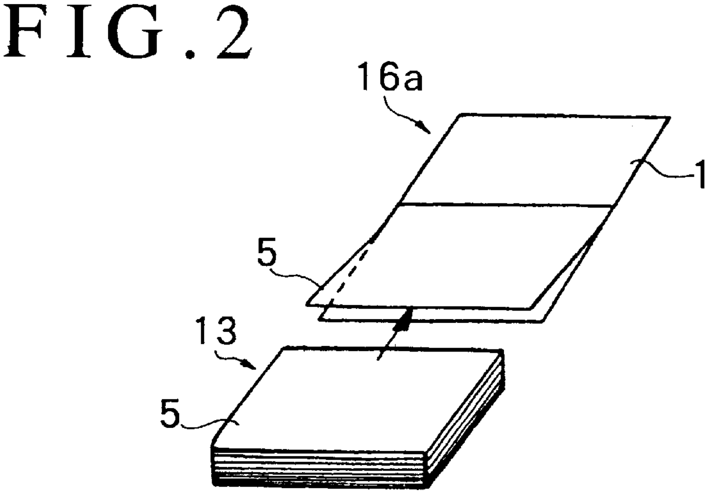
FIG. 2 is a perspective view showing a step of combining a protective film with the data sheet.
Figure 3A:
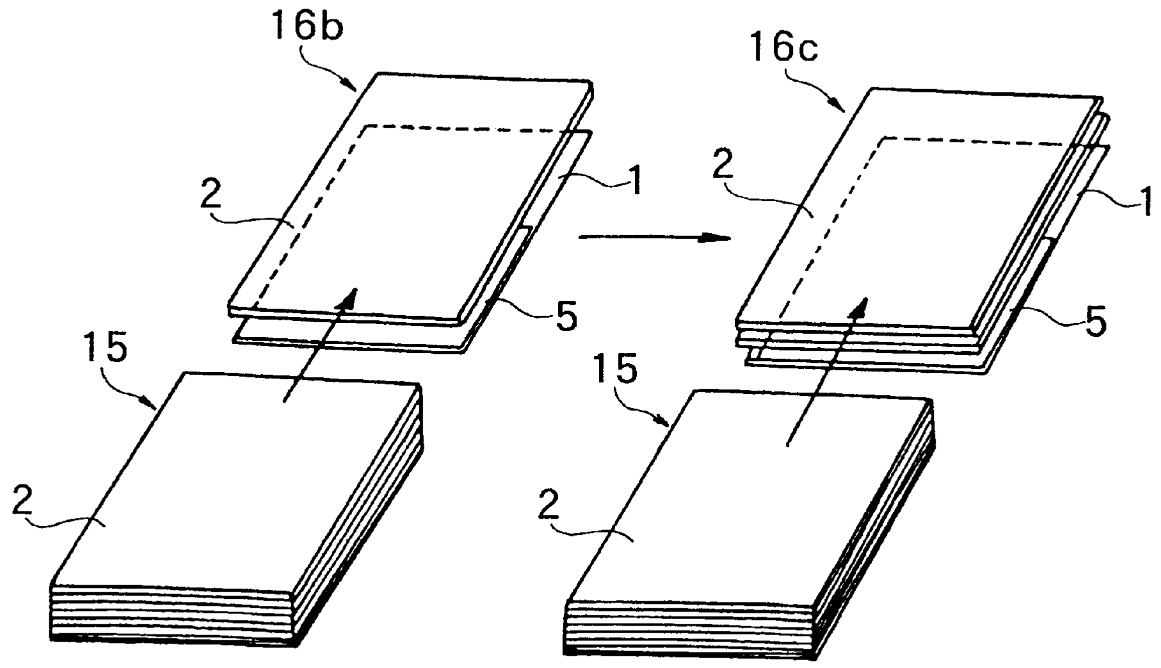
FIG. 3A is a perspective view showing a step of combining a visa sheet with the data sheet and the protective film.
Figure 3B:
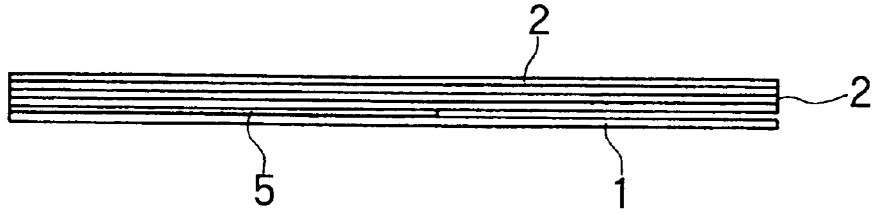
FIG. 3B is a side view showing a combined state of the data sheet, the protective film and the visa sheet.

First, as shown in FIG. 2, a protective film 5 consisting of a see-through synthetic resin film is combined with an inner surface of each personal data sheet 1 with the visually readable personal data recorded thereon.

The protective film 5 may be rolled out of a take-up roll, cut into a prescribed size and then combined with the inner surface of the data sheet 1. It is also an interesting alternative that the protective films 5 each preliminarily cut into a prescribed size are stacked up for stock and then, the protective films 5 are fed, one at a time, to a combining position 16*a* from the stock position 13 and combined with the inner surface of the data sheet 1.

Figure 4A:
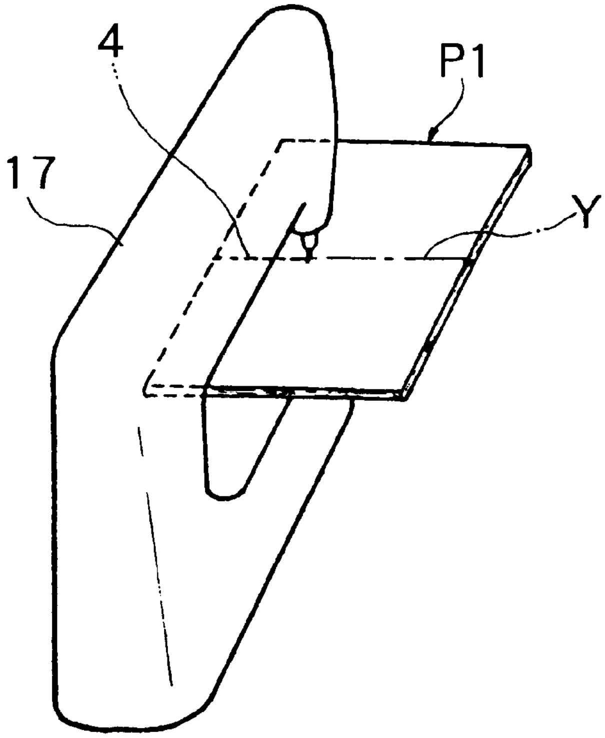
FIG. 4A is a perspective view showing a step of obtaining an inner sheet block by stitching with a thread after the completion of combination of the data sheet, the protective film and the visa sheet.
Figure 4B:
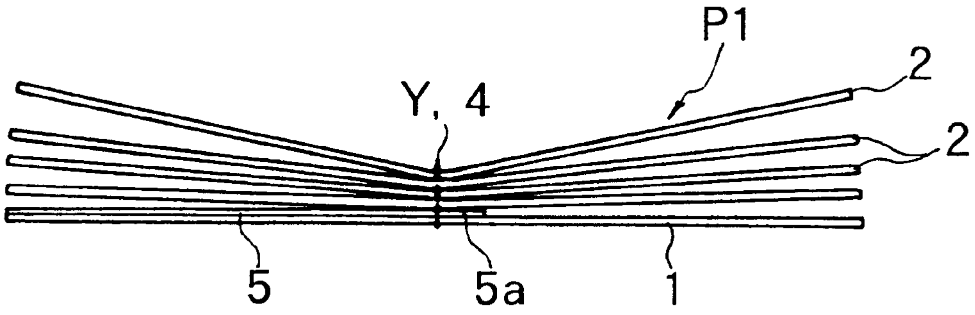
FIG. 4B is a side view showing a thread-stitched state of the combined data sheet, protective film and visa sheet.

Then, as shown in FIGS. 4A, and 4B, after the protective film 5 and the visa sheets 2 are combined with the inner surface of the data sheet 1, a stitching is applied to the central binding line Y of the sheets 1, 2 using a sewing machine 17 to thereby form a flat inner sheet block P1. Accordingly, this means that the stitching step is performed after the visually readable personal data are recorded on the data sheet 1.

The protective film 5 is dimensioned large enough to cover the data recording page of the data sheet 1. The protective film 5 is provided at one end thereof with a stitching width 5*a* extending beyond the central binding line Y and reaching the throat area S of the data sheet 1. This stitching width 5*a* is bound with the stitching thread 4 together with other sheets 1, 2.

Figure 5A:
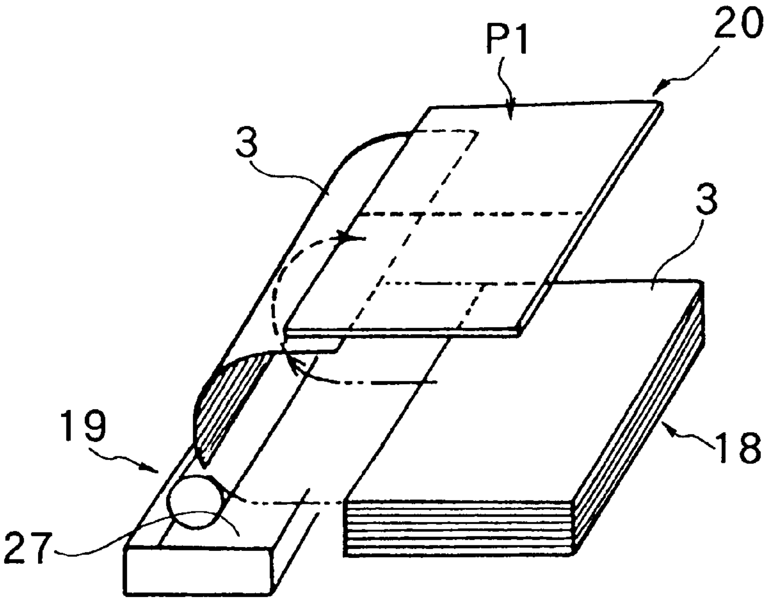
FIG. 5A is a step of obtaining a booklet block by bonding the thread-stitched inner sheet block to a cover sheet.
Figure 5B:
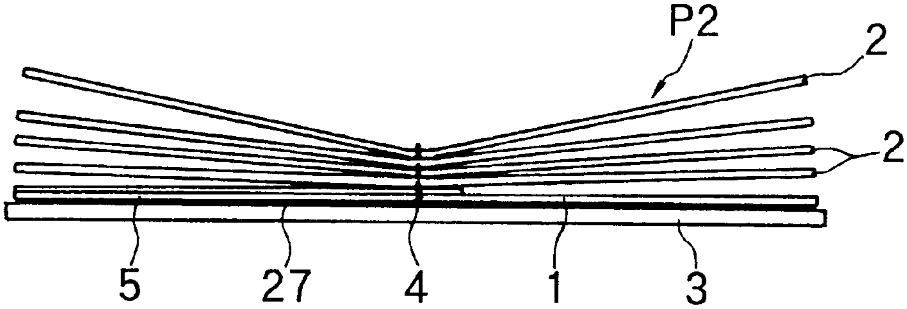
FIG. 5B is a side view of the booklet block with the cover sheet bonded thereto.

Then, as shown in FIGS. 5A, and 5B, the inner sheet block P1 is subjected to a step of bonding the cover sheet 3. A plurality of cover sheets 3 each cut into a prescribed size, are stacked up at a stock position 18. Then, the cover sheets 3 are supplied, one at a time, to an adhesive position 19. After being applied with an adhesive agent to the inner surface of each cover sheet 3 at the adhesive position 19, the cover sheet 3 is moved to a binding position 20 where the cover sheet 3 is bound and bonded to the outer surface (back surface) of the data sheet to form a booklet block P2.

Figure 6:
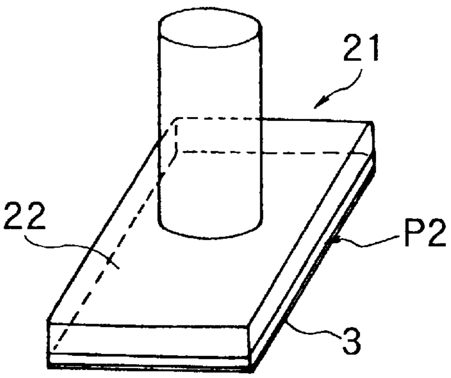
FIG. 6 is a perspective view showing a step of pressing the cover sheet.

Then, as shown in FIG. 6, the booklet block P2 is pressed and dried by a pressing board 22 at a press position 21 so that the cover sheet 3 and the data sheet 1 are firmly bonded together.

Figure 7:
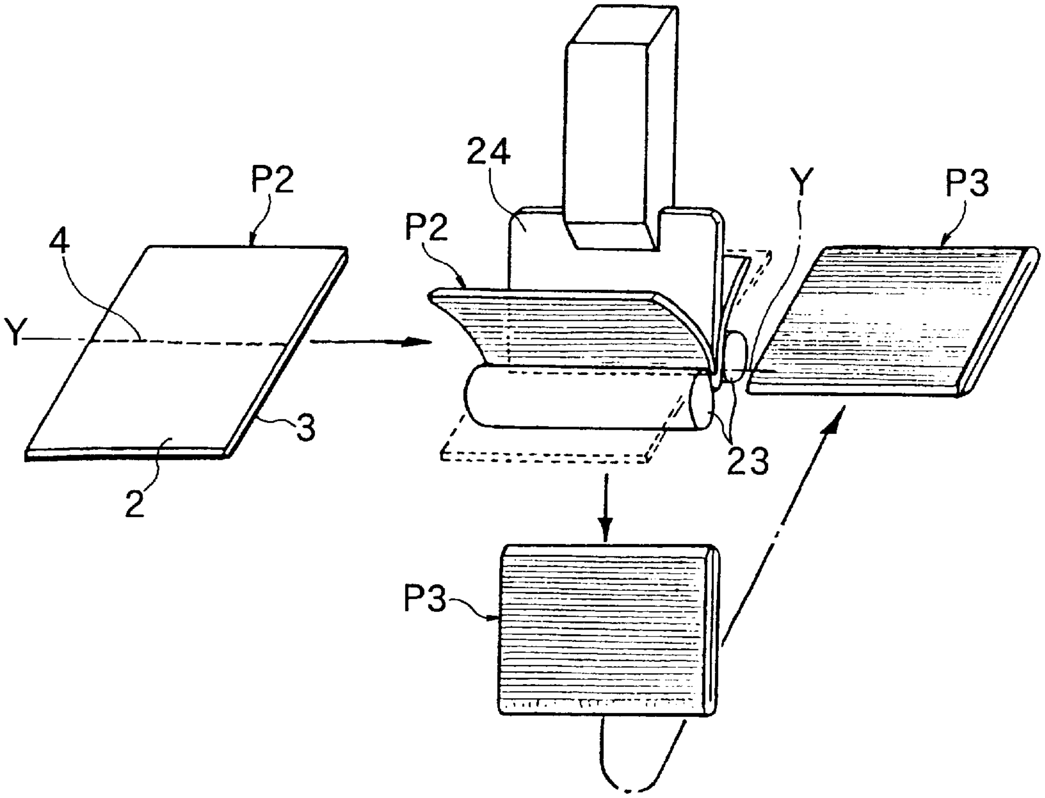
FIG. 7 is a perspective view showing a step of double folding the booklet block.

Subsequently, the booklet block P2 is subjected to a step of double folding. As shown in FIG. 7, the booklet P2 having the data sheet 1 and the protective film 5 stitched together with a thread and the cover sheet 3 attached thereto is pushed into between a pair of folding rolls 23, with the central binding line (stitching line) Y being inserted first, by a blade 24 so that the booklet P2 is double folded. As a consequence, a double folded booklet block P3 is formed.

Owing to this double folding, the stitching width 5*a* of the protective film 5 is also bent at the central binding line Y of the protective film 5 together with the data sheet.

Figure 8:
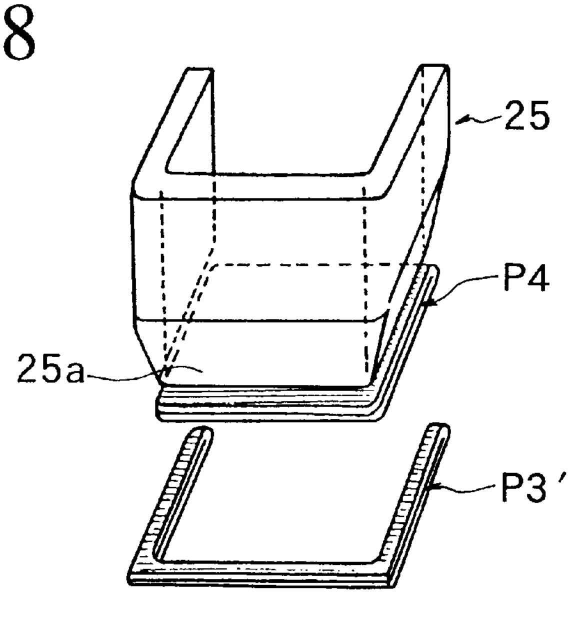
FIG. 8 is a perspective view showing a step of obtaining a finish-cut passport by finish-cutting the double folded booklet block.

Then, the double folded booklet block P3 is subjected to a finish cutting step. As shown in FIGS. 8A and 8B, after the double folding, three sides of the double folded booklet block P3 excluding the back portion, namely, a front edge, an upper edge and a lower edge of the double folded booklet block P3, are finish-cut by cutting means 25. As a consequence, a finish-cut passport P4 with the visually readable personal data recorded in the first recording step is provided.

The cutting means used for finish-cutting is formed of a single cutter block having a U-shaped cutting edge 25*a*. In operation, three sides of the double folded booklet block P3 are cut all at once by the cutting means. By doing so, a single frame P3' is produced.

Before the double folding step of FIG. 7, in other words, after the cover sheet bonding step, a finish cutting can be applied to the flat booklet block P2 formed in that step. In this case, the entire peripheral edges of the opened flat booklet block P2 are cut all at once by a single cutter block having a frame-like cutting edge, and after the finish-cutting, the double folding of FIG. 7 may be applied thereto.

The steps from FIG. 2 to FIG. 8 are referred to as a bookmaking step.

Then, the finish-cut passport is subjected to a second recording step of FIG. 10 via a step of opening the data sheet 1.

Figure 9A:
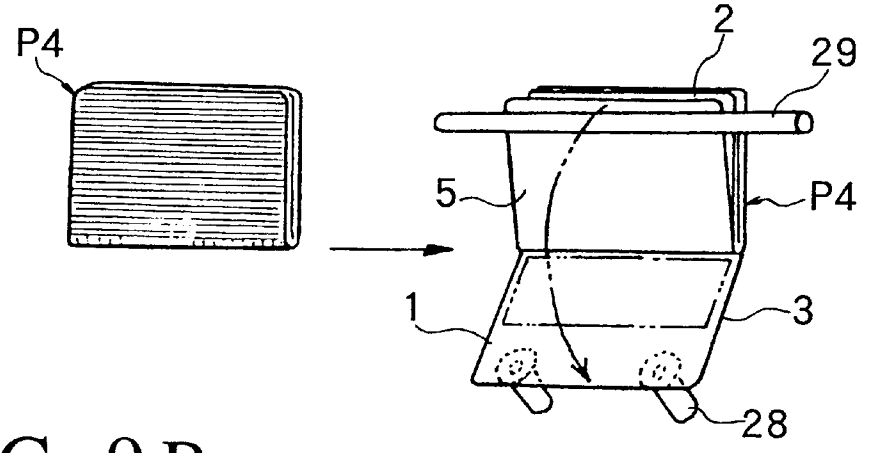
FIG. 9A is a perspective view showing a step of opening the data sheet of the finish-cut passport.
Figure 9B:
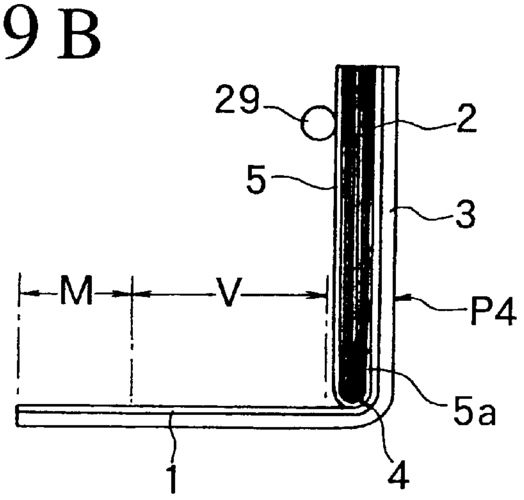
FIG. 9B is a side view showing an open state of the data sheet.

As shown in FIG. 9, the finish-cut passport P4 is transferred in an erected state with the back supported on a transferring surface and the front cover sheet sucked by a suction 28 so as to be horizontally opened. While doing so, the protective film 5 located next to the front cover sheet is held in an erected state with a bar 29. As a consequence, a horizontal open state of the data recording page of the data sheet 1 is realized.

Figure 10A:
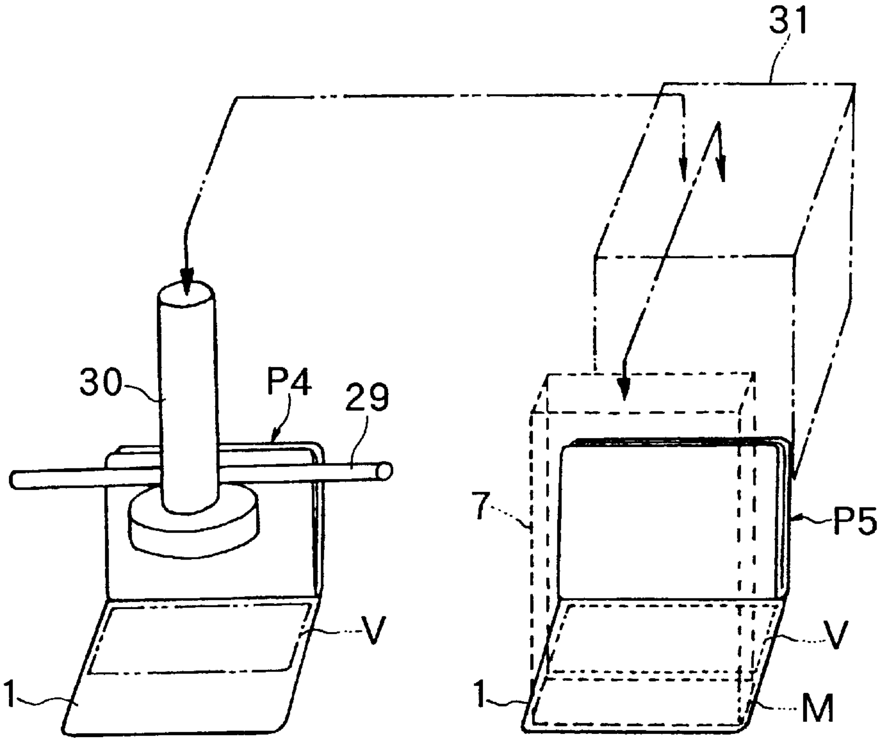
FIG. 10A is a perspective view showing a step of obtaining a recorded passport via a second recording step of recording mechanically readable personal data.
Figure 10B:
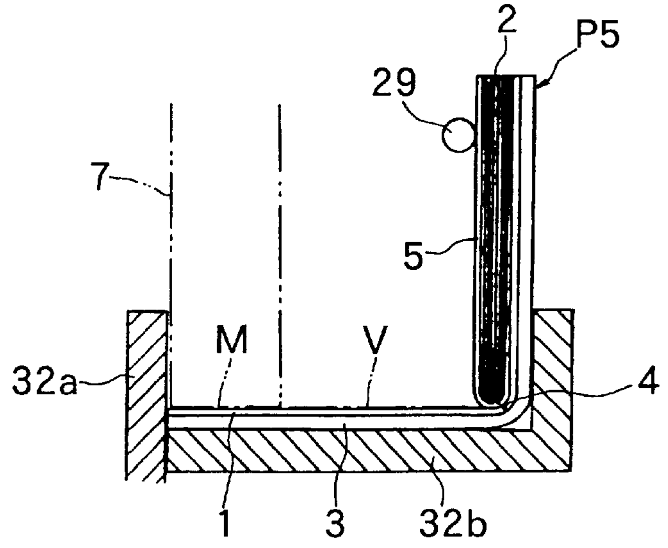
FIG. 10B is a sectional view of a guide mechanism when the mechanically readable personal data are being printed.

After forming the open state, the passport P4 is subjected to the second recording step of FIGS. 10A and 10B.

As shown in FIGS. 10A and 10B, while holding the front cover sheet in a horizontal state, the data recording page of the data sheet 1 is brought into a horizontal open state. Then, the visually readable personal data recorded on the recording zone V of the data recording page are read in a non-contact style using an optical reading device 30.

At the same time, the data thus read are input into a data identification processor (computer) 31. In the computer 31, the visually readable personal data are converted to mechanically readable personal data and then input into the printing machine 7 for printing. In response to a printing command from the computer, the printing machine 7 records the mechanically readable personal data on the recording zone M of the data sheet 1.

The printing machines 6, 7 used in the first recording step and the second recording step may be an electronic printing machine, an injection printer, a color copying machine, a photo-technical printing machine, a transferring apparatus or the like. A sheet on which data are recorded using one of those printing machines as printing means can be bonded to the data base.

In the finish cut passport P4, the front edges of the front cover sheet and the data sheet 1 are finish cut. While horizontally holding the finish cut front cover sheet with a bottom guide 32*b*, the front edge of the cover sheet is restricted with a side guide 32*a*. With reference to this front edge, the mechanically readable personal data are recorded on the recording zone M. As a consequence, the mechanically readable personal data can be recorded in parallel relation to the front edges of the finish cut front cover sheet and data sheet 1. This effectively prevent the data from being recorded in slantwise relation.

Since the mechanically readable personal data are recorded in response to a visually readable personal data reading signal by the reading device 30, recording errors to the recording zone M can reliably be prevented. In this way, there can be obtained a recorded passport P5 with the visually readable personal data recorded on the recording zone V of the data sheet 1 and with the mechanically readable personal data recorded on the recording zone M of the data sheet 1.

Subsequently, the recorded passport 5 is subjected to a laminating step of FIGS. 12A and 12B via the opening step of the protective film 5 of FIGS. 11A and 11B.

Figure 11A:
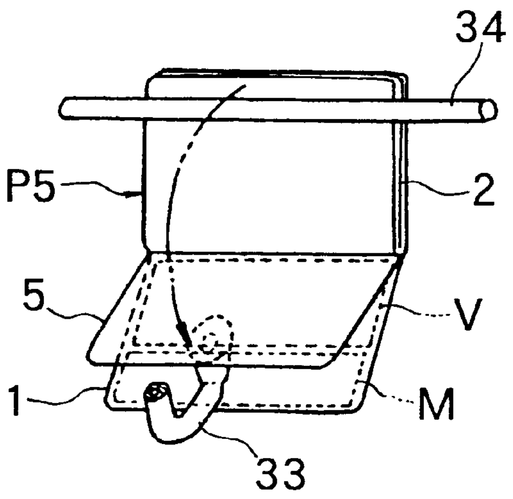
FIG. 11A is a perspective view showing a step of placing a protective film on a data sheet.
Figure 11B:
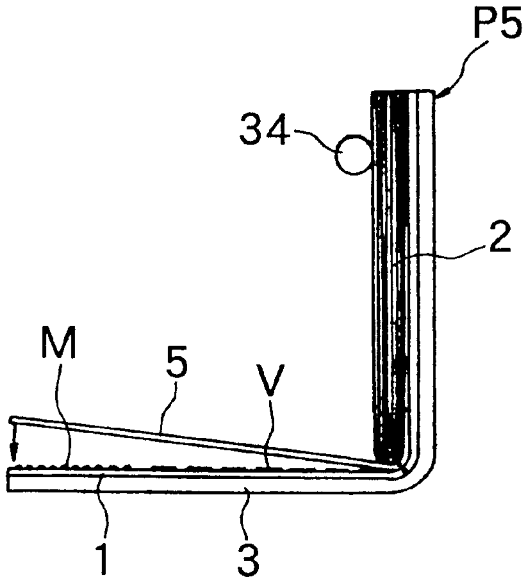
FIG. 11B is a sectional view of FIG. 11A.
Figure 12:
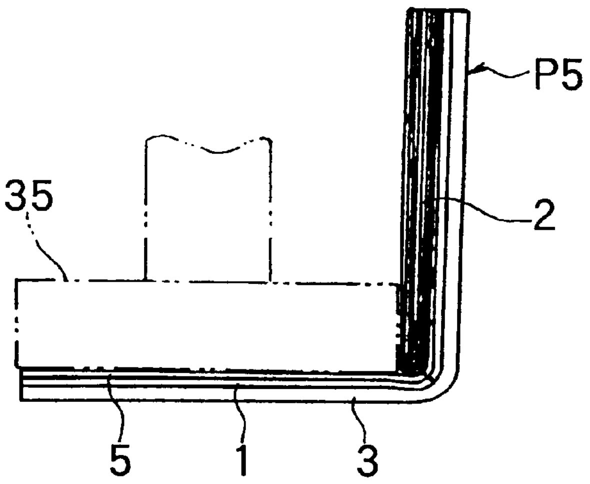
FIG. 12 is a side view showing a step of laminating the protective film on a data sheet.

While holding a horizontal opening state (FIGS. 10A and B) of the data sheet 1, the protective film 5 is sucked by a suction 33 so as to be horizontally opened as shown in FIG. 11A. While doing so, the visa sheet 2 located next to the protective film 5 is held in an erected state with a bar 34. As a consequence, a state where the protective film 5 is horizontally superposed upon the surface of the data recording page of the data sheet 1 is realized.

After the protective film 5 is superimposed upon the surface of the data recording page, the protective film 5 is laminated to the surface of the data recording page using a hot plate or a high frequency bonding device 35. The personal data recorded on the recording zones V and, M are covered with the protective film 5 and visually recognizable through the protective film 5.

Figure 13:
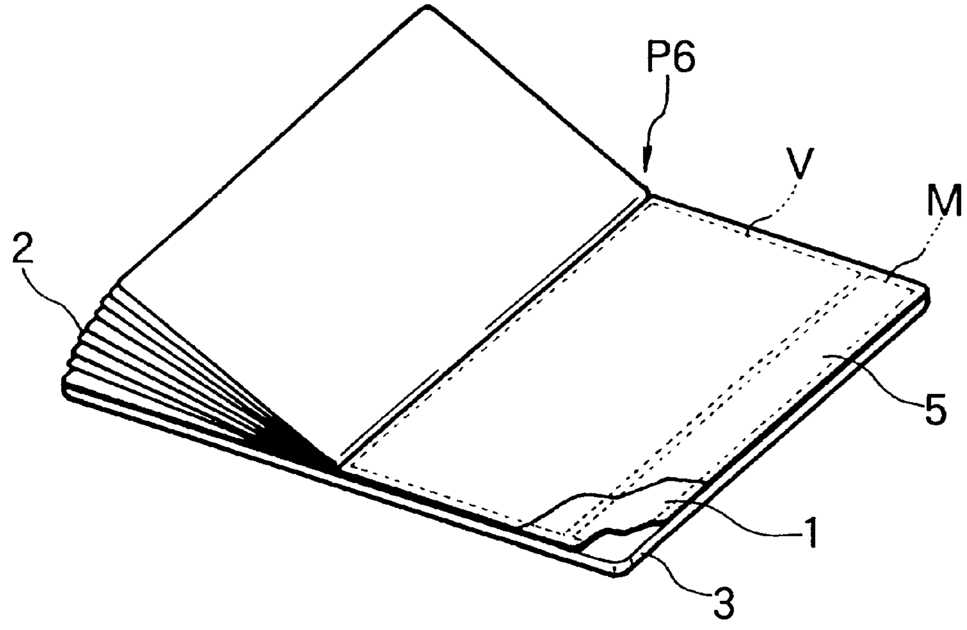
FIG. 13 is a perspective view of a passport with two kinds of personal data recorded thereon and a protective film laminated thereon.
Figure 14A:
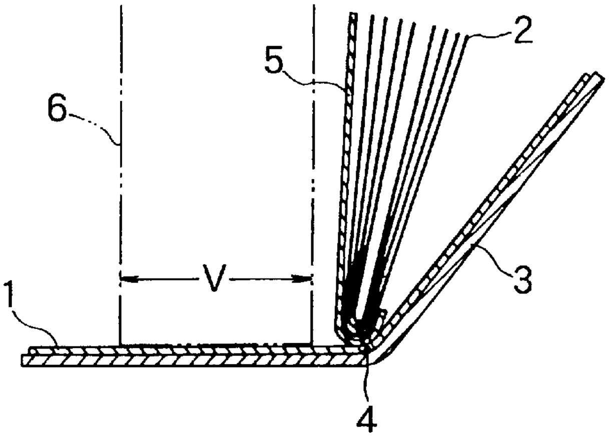
FIG.14A PRIOR ART
FIGS. 14A, and B are side views each showing a step of recording personal data after bookmaking of a passport according to the prior art.
Figure 14B:
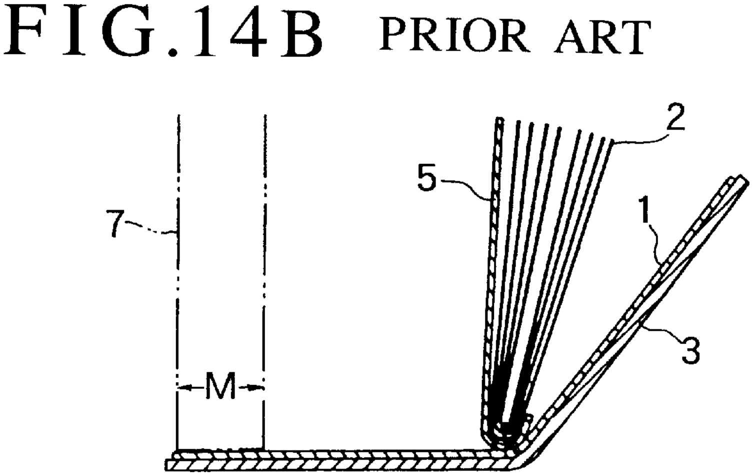
FIG.14B PRIOR ART
FIG. 14C is a plan view of a data sheet of the passport.
Figure 14C:
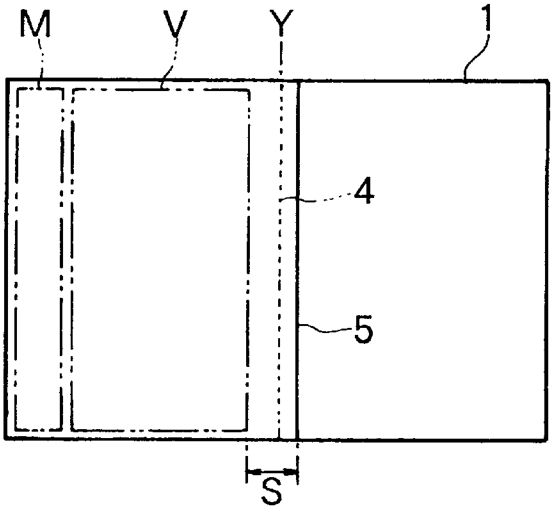
FIG.14C PRIOR ART

In this way, there can be obtained a passport P6 with two kinds of personal data recorded thereon and laminated by the protective film 5, as shown in FIG. 13.

The protective film 5 is not bound in the bookmaking step of the passport. The protective film 5 is combined after the second recording step is performed, so that the personal data are laminated by the protective film 5. Instead of the protective film, a protective layer may be formed on the surface of the personal data by applying a fluid resin thereto.

According to the present invention, it is possible to set up a suitable continuous production system in which the personal data are recorded while bookmaking a virgin passport on a bookmaking line. Thus the present invention can contribute to an efficient and time-saving passport issuing system.

By employing a method for recording visually readable personal data on the data sheet at the entrance of a bookmaking line and before the bookmaking step is performed, the recording zone V of the visually readable personal data can be expanded very close to the central binding line, and therefore, the recording area of the recording zone M of the mechanically readable personal data can be increased.

In addition, by recording the mechanically readable personal data after the bookmaking of the finish cut passport, the data can be recorded in parallel relation to the front edges of the finish cut cover sheet and data sheet. Owing to this arrangement, reading errors can effectively be prevented from occurring.

According to the present invention, issuing time and manufacturing cost of the passport can be reduced, and an efficient passport issuing system can be realized.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing passports comprising reading personal data from a data base of a passport bookmaking line and recording visually readable personal data, corresponding to said personal data, on a personal data sheet at an entrance of a passport book-making line; performing passport bookmaking comprising binding said personal data sheet, having said visually readable personal data recorded thereon, together with a visa sheet; and reading the visually readable personal data recorded on said personal data sheet after said binding is performed, and recording onto said personal data sheet mechanically readable personal data corresponding to said visually readable personal data recorded on said personal data sheet.

2. A method for manufacturing passports according to claim 1, wherein said passport bookmaking further comprises finish-cutting three sides of said visa sheet bound together with said personal data sheet, excluding a back thereof.

3. A method for manufacturing passports according to claim 1, wherein said passport bookmaking further comprises binding a see-through protective film, and said method further comprises, after said machine readable personal data has been recorded on said personal data sheet, laminating said protective film on an inner surface of said personal data sheet such that said protective film covers said mechanically readable personal data and said visually readable personal data.

* * * * *